(12) United States Patent
Kaku et al.

(10) Patent No.: US 8,585,088 B1
(45) Date of Patent: Nov. 19, 2013

(54) UTILITY VEHICLE

(71) Applicant: Kawasaki Jukogyo Kabushiki Kaisha, Hyogo (JP)

(72) Inventors: Hidetoshi Kaku, Kakogawa (JP); Yoshinori Tsumiyama, Miki (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/728,352

(22) Filed: Dec. 27, 2012

(51) Int. Cl.
*B60R 21/13* (2006.01)
*B62D 25/18* (2006.01)

(52) U.S. Cl.
USPC .......................... 280/756; 280/848; 280/851

(58) Field of Classification Search
USPC ............... 280/756, 785, 847, 849, 851, 848; 296/198; 180/291, 311, 312, 908
See application file for complete search history.

(56) References Cited

U.S. PATENT DOCUMENTS

| | | | |
|---|---|---|---|
| 6,193,278 B1 * | 2/2001 | Ward et al. | 280/848 |
| 8,118,329 B2 * | 2/2012 | Braga | 280/848 |
| 2008/0048426 A1 * | 2/2008 | Frett et al. | 280/756 |
| 2012/0056411 A1 * | 3/2012 | Nakamura et al. | 280/756 |
| 2012/0217078 A1 * | 8/2012 | Kinsman et al. | 180/69.4 |
| 2013/0049339 A1 * | 2/2013 | Kwon et al. | 280/756 |

FOREIGN PATENT DOCUMENTS

JP   7-315251   12/1995

OTHER PUBLICATIONS

Ricochet RZR 800, Copyright 2009 Ricochet Offroad Armor Registered. http://www.ricochetoffroad.com/store/page106.html.*
Copyright 2009 Ricochet Offroad Armor Registered. http://www.ricochetoffroad.com/store/newrzrpic.htm.*

* cited by examiner

*Primary Examiner* — Joseph Rocca
*Assistant Examiner* — Robert A Coker
(74) *Attorney, Agent, or Firm* — Wenderoth, Lind & Ponack, L.L.P.

(57) ABSTRACT

A utility vehicle includes a mainframe located between one pair of left and right front wheels and at least one pair of left and right rear wheels and forming a framework of a chassis. A ROPS (Roll-Over Protective Structure) is provided in a middle part in the vehicle-body front-rear directions in the mainframe, and thereby surrounds a cabin. Front under guards are provided in spaces on rear sides of the front wheels so as to cover mud guard walls provided for separating the cabin from the spaces on the rear sides of the front wheels.

13 Claims, 11 Drawing Sheets

UTILITY VEHICLE

BACKGROUND OF THE INVENTION

1. Field of the Invention

The present invention relates to a utility vehicle and, in particular, to a front under guard structure of a utility vehicle.

2. Description of the Prior Art

In vehicles for running on general roadways, front wheel mud guards for avoiding mud splashed by the front wheels are attached to a vehicle body on the rear sides of front wheels. For example, a prior art in Japanese Laid-Open Patent Publication No. H07-315251 discloses a technique that mud guards composed of a resin material are attached to a vehicle body on the rear sides of front wheels in wheel houses so that scattering of mud to the rear sides of the front wheels is avoided.

Meanwhile, utility vehicles for running in off-road circumstances such as uneven ground surfaces and rocky surfaces are used in various kinds of applications like leisure use as a truck for hunting and work use as a truck for agricultural, work. When such utility vehicles run in off-road circumstances, obstacles such as stones and wooden twigs are kicked up by the wheels in some cases.

The engine of a utility vehicle is installed in an engine room located generally between the front wheels and the rear wheels of the vehicle-body frame. An engine under guard is arranged under the engine. Then, the engine under guard avoids a situation that obstacles such as stones and wooden twigs, for example, kicked up by the front wheels, hit the engine or the like. In the surroundings of the front wheels serving as steering-achieving wheels, wheel houses are formed for accommodating the front wheels. Then, in order to ensure a steering margin for the front wheels, spaces are formed in the vehicle-body front-rear directions in the wheel houses for front wheels.

Obstacles such as stones and wooden twigs kicked up by the front wheels may hit the engine under guard and, in some cases, enter the large spaces formed in the vehicle-body front-rear directions in the wheel houses for front wheels.

SUMMARY OF THE INVENTION

The present invention has been devised in view of the above-mentioned problems. An object thereof is to provide a front under guard structure for avoiding a situation that obstacles such as stones and wooden twigs kicked up by the front wheels enter the wheel houses for front wheels.

In order to achieve the above-mentioned object, the present invention provides a utility vehicle comprising: a mainframe located between one pair of left and right front wheels and at least one pair of left and right rearwheels and forming a framework of a chassis; a ROPS (Roll-Over Protective Structure) provided in a middle part in the vehicle-body front-rear directions in the mainframe and thereby surrounding a cabin; and front under guards provided in spaces on rear sides of the front wheels such as to cover mud guard walls provided for separating the cabin from the spaces on the rear sides of the front wheels.

According to this configuration of the present invention, the front under guards avoid a situation that obstacles such as stones and wooden twigs kicked up by the front wheels enter the spaces on the rear sides of the front wheels.

In the present invention, preferably, the front under guards are attached to frontward parts of front cross members of the mainframe located at positions facing the front wheels and are constructed from outer frameworks of pipe shape.

According to the above-mentioned configuration, the number of components necessary for constructing the front under guards is reduced.

In the present invention, preferably, the front under guards are attached to frontward parts of front cross members of the mainframe located at positions facing the front wheels and are constructed from outer frameworks of pipe shape and from plate-shaped bodies extending from the outer frameworks toward the frontward parts of the front cross members.

According to the above-mentioned configuration, the use of the outer frameworks of pipe shape ensures a rigidity necessary in the front under guards even when a smaller amount of material is used.

In the present invention, preferably, the front under guards are attached so as to extend in an approximately horizontal direction to the frontward parts of the front cross members.

According to the above-mentioned configuration, the amount of material used in the front under guards is reduced into a necessary minimum.

In the present invention, preferably, the front cross members of the mainframe extend obliquely rearward toward outer sides in plan view.

According to the above-mentioned configuration, the rigidity of the mainframe increases in the circumference of the wheel houses for front wheels and, at the same time, foot-side spaces for a driver and a fellow passenger sitting on the seats are allowed to be expanded.

In the present invention, preferably, the front under guards further include rise guard walls rising from frontward parts of the front under guards.

According to the above-mentioned configuration, the rise guard walls are attached easily.

In the present invention, preferably, the front under guards are attached directly to outer side surfaces of the mud guard walls.

According to the above-mentioned configuration, the number of components necessary in the front under guards is reduced and, at the same time, the front under guards are attached easily.

In the present invention, preferably, the front under guards are capable of being used in common in the left and right front wheels (i.e., each front under guard can be used in either front wheel).

According to the above-mentioned configuration, the front under guards are in a form permitting common use. This reduces the number of necessary components so as to simplify the management of the components and reduce the cost of the front under guards.

DETAILED DESCRIPTION OF THE PREFERRED EMBODIMENTS

Embodiments of the present invention are described below with reference to the drawings. Here, directions such as front, rear, left, right, up, and down employed in this specification are defined as those viewed from a driver on a utility vehicle 1.

First Embodiment

Figure 1:
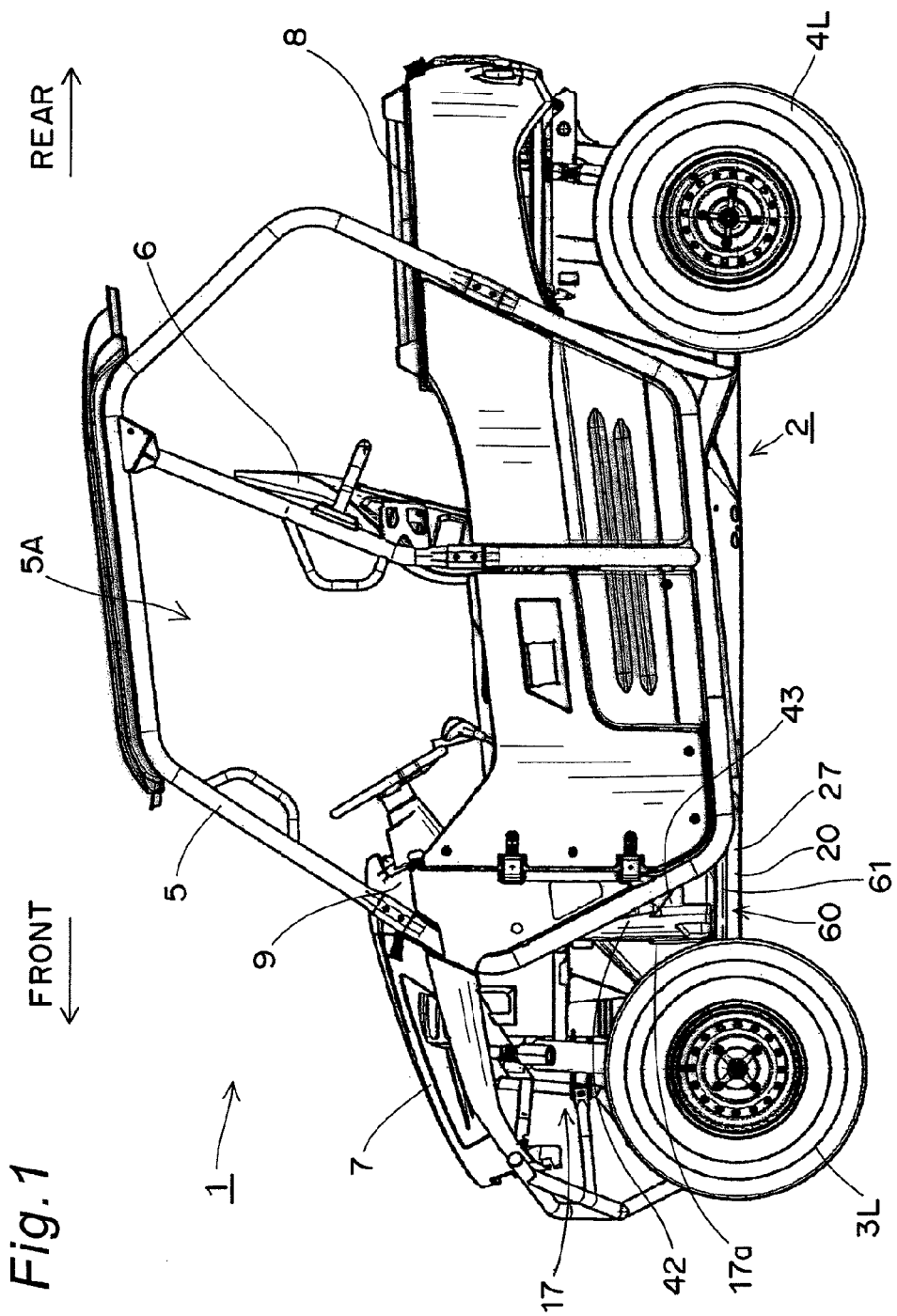
FIG. 1 is a left side view of a utility vehicle according to a first embodiment of the present invention.
Figure 2:
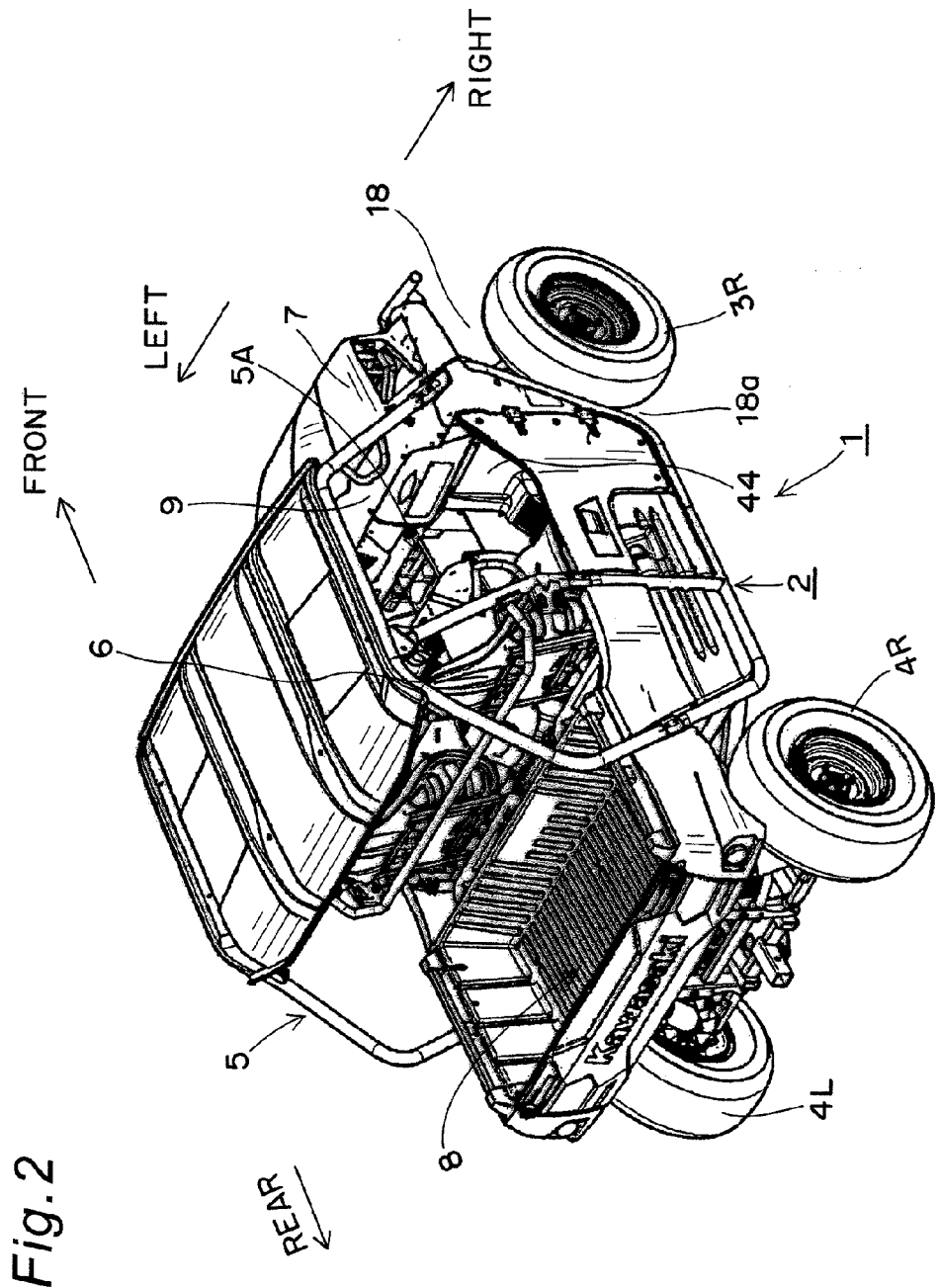
FIG. 2 is a perspective view of a utility vehicle viewed downward from an oblique rear right direction.

FIG. 1 is a left side view showing a utility vehicle 1 according to a first embodiment of the present invention. FIG. 2 is a perspective view of the utility vehicle 1 shown in FIG. 1, viewed downward from an oblique rear right direction. The utility vehicle 1 is used mainly for running in off-road circumstances like a grass field, a gravel field, and a sand field as well as an unpaved mountain path, an unpaved path through a wood, a mud path, and a rocky field.

(Overall Structure of Utility Vehicle 1)

The utility vehicle 1 shown in FIGS. 1 and 2 is a four-wheel vehicle provided with a left front wheel 3L and a right front wheel 3R respectively located in the left and the right of the front part of a vehicle-body frame 2 and with a left rear wheel 4L and a right rear wheel 4R respectively located in the left and the right of the rear part of the vehicle-body frame 2. The utility vehicle 1 has a cabin 5A surrounded by a cabin frame, i.e., a ROPS (Roll-Over Protective Structure) 5, which is located in the middle part in the vehicle-body front-rear directions between the one pair of left and right front wheels 3L and 3R and the one pair of left and right rear wheels 4L and 4R. Crew seats 6 on which a driver and a fellow passenger are to sit are provided respectively on the left side and the right side in a frontward part relative to the center in the vehicle-body front-rear directions of the cabin 5A. The ROPS 5 is constructed from cylindrical pipe materials composed of metal. Its front, rear, right, left, and upper parts are opened. The ROPS 5 serves also as an attaching element used for attaching a roof, a hood, or the like for avoiding rain or sunlight. A bonnet 7 is provided above the one pair of left and right front wheels 3L and 3R. The inner space of the bonnet 7 contains a radiator, an air inlet duct, and the like (not shown). A dash board 9 is provided in the front end part of the cabin 5A in the vehicle-body front-rear directions.

As shown in FIG. 2, a loading platform 8 is provided behind the crew seats 6. The loading platform 8 extends rearward above the one pair of left and right rear wheels 4L and 4R starting at a position near the rear part of the crew seats 6. Under the right part of the dash board 9 a right mud guard wall 44 is provided for separating the cabin 5A from a space 18a on the rear side of the right front wheel 3R in a right wheel house 18. An engine unit (not shown) for running and driving is arranged at a rearward position relative to the crew seats 6 in the vehicle-body front-rear directions. Further, in the utility vehicle 1, doors arbitrarily opened and closed when the crew members are to get on or off are provided on the left and the right sides of the ROPS 5.

(Structure of Vehicle-Body Frame 2 in Utility Vehicle 1)

Figure 3:
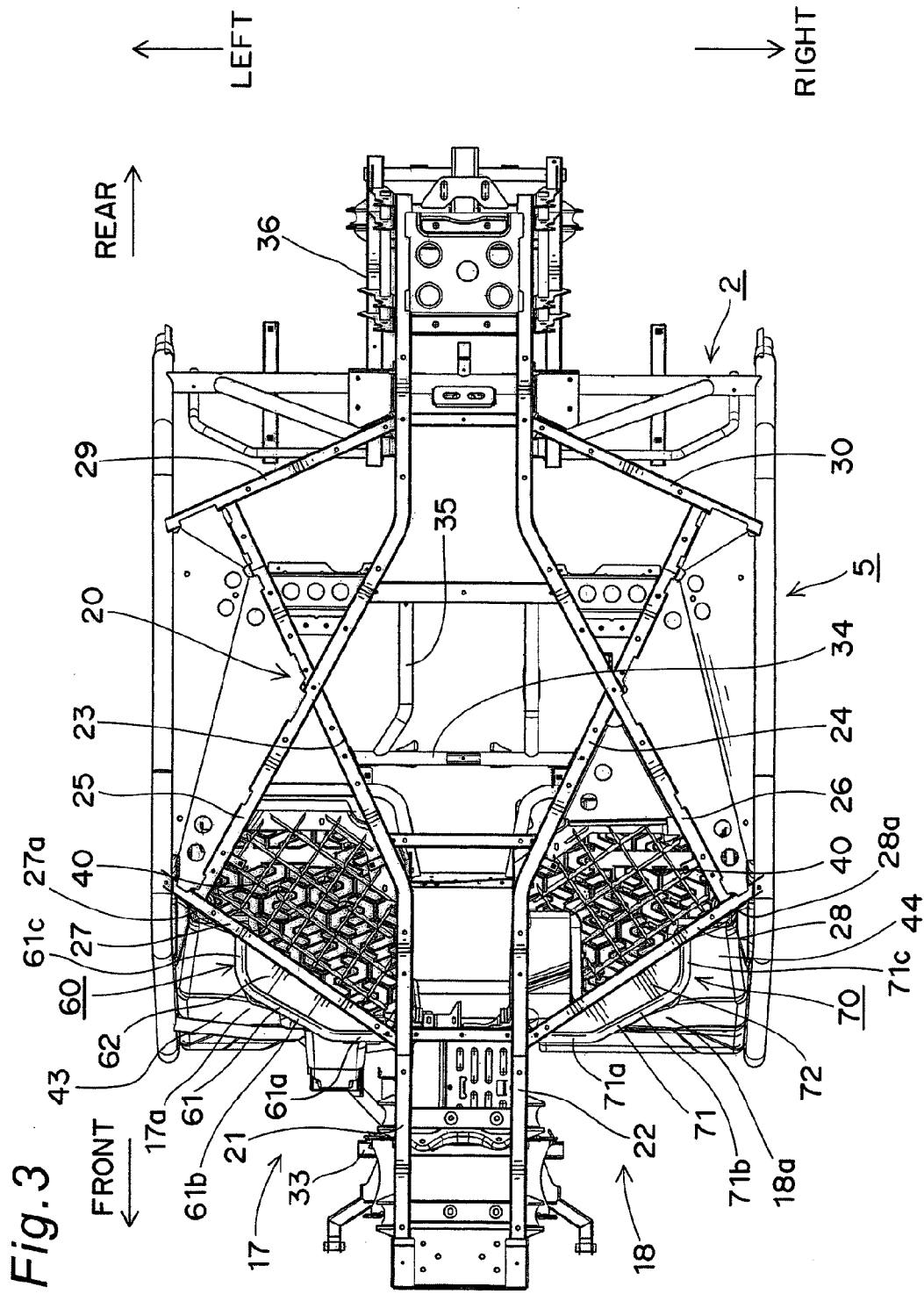
FIG. 3 is a bottom view of a vehicle-body frame of a utility vehicle.
Figure 4:
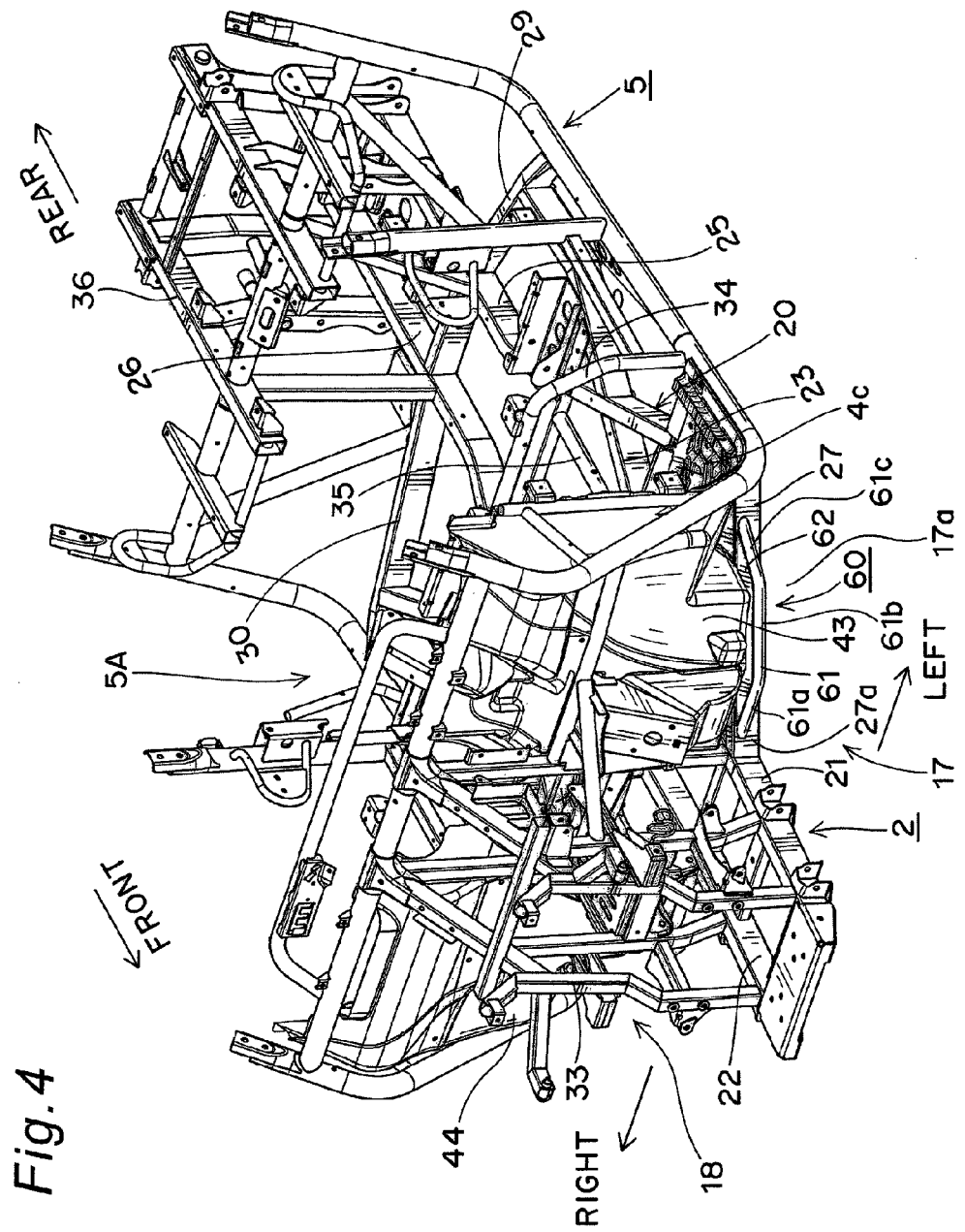
FIG. 4 is a perspective view of a vehicle-body frame viewed downward from an oblique front left direction.
Figure 5:
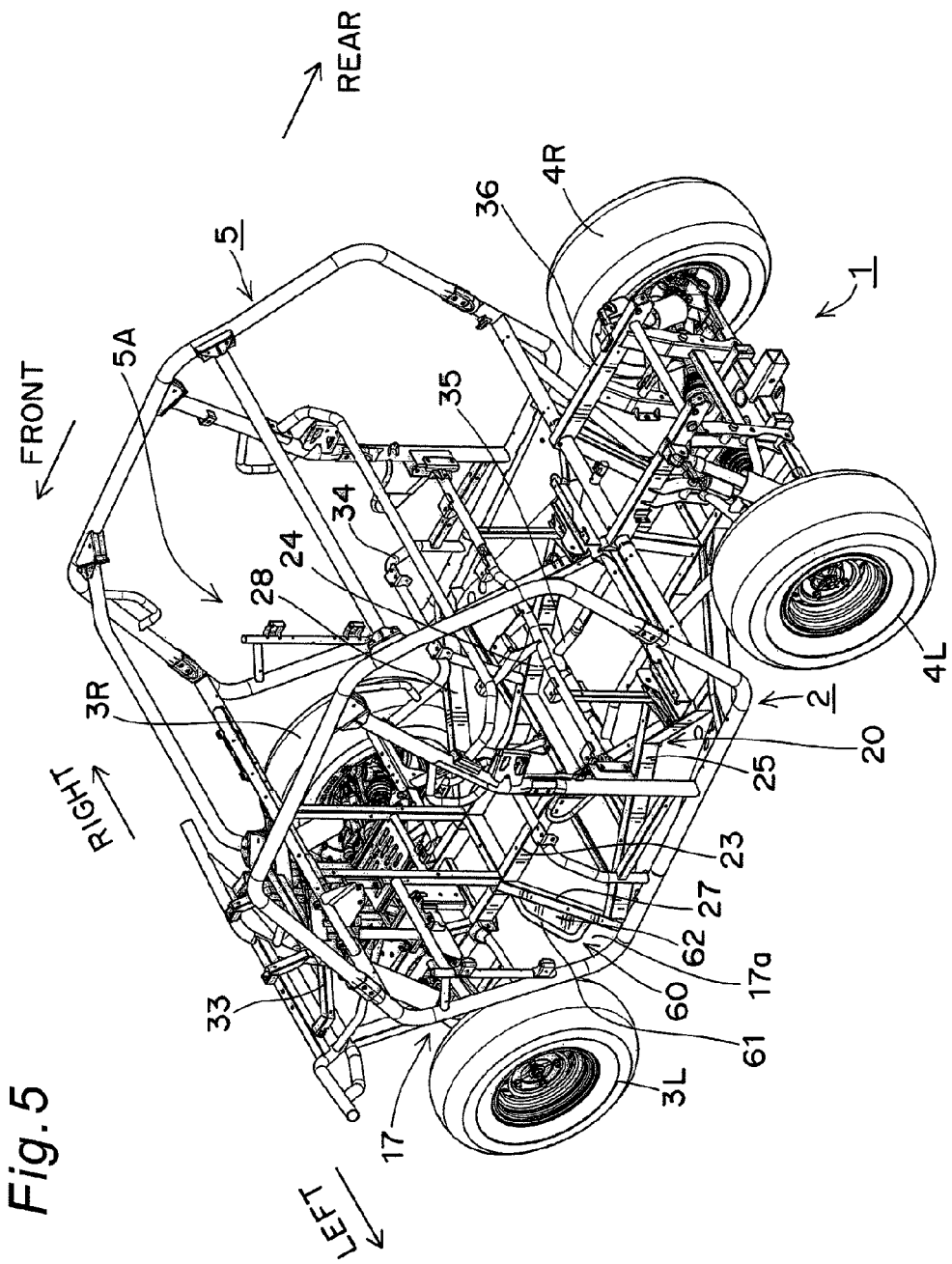
FIG. 5 is a perspective view of a vehicle-body frame viewed downward from an oblique rear right direction.

FIG. 3 is a bottom view showing the vehicle-body frame 2 of the utility vehicle 1 shown in FIG. 1. FIG. 4 is a perspective view of the vehicle-body frame 2 viewed downward from an oblique front left direction. FIG. 5 is a perspective view of the vehicle-body frame 2 viewed downward from an oblique rear right direction. As shown in FIG. 3, the vehicle-body frame 2 is constructed mainly from hollow pipe materials (having rectangle and circular cross sections) composed of metal and, in combination, from plate materials. The vehicle-body frame 2 has a mainframe 20 that forms the framework of the chassis and is located between the one pair of left and right front wheels 3L, and 3R and the one pair of left and right rear wheels 4L and 4R. The mainframe 20 is formed approximately symmetric in the vehicle-body width directions (the right-left directions).

As shown in FIG. 3, a left front frame 21 and a right front frame 22 for supporting a radiator (not shown) and the like protrude frontward respectively from the front end part of the mainframe 20. In the center part in the vehicle-body front-rear directions of the mainframe 20, a left center frame 23 and a right center frame 24 extend respectively. The left center frame has a frontward straight line part extending in the vehicle-body front-rear directions and a rearward bent part bent from the frontward straight line part toward the outer left direction. Similarly, the right center frame 24 has a frontward straight line part extending in the vehicle-body front-rear directions and a rearward bent part bent from the frontward straight line part toward the outer right direction. In the rear part in the vehicle-body front-rear directions of the mainframe 20, a left rear frame 25 and a right rear frame 26 extend respectively. The left rear frame 25 has: a frontward bent part bent from the outer left direction toward the center; and a rearward straight line part extending from the frontward bent part in the vehicle-body front-rear directions. Similarly, the right rear frame 26 has: a frontward bent part bent from the outer right direction toward the center; and a rearward straight line part extending from the frontward bent part in the vehicle-body front-rear directions. The rearward bent part of the left center frame 23 and the frontward bent part of the left rear frame 25 intersect with each other at an approximately center part of the two. Then, the intersecting part is fixed by welding, bolting, or the like. Similarly, the rearward bent part of the right center frame 24 and the frontward bent part of the right rear frame 26 intersect with each other at an approximately center part of the two. Then, the intersecting part is fixed by welding, bolting, or the like.

Figure 6:
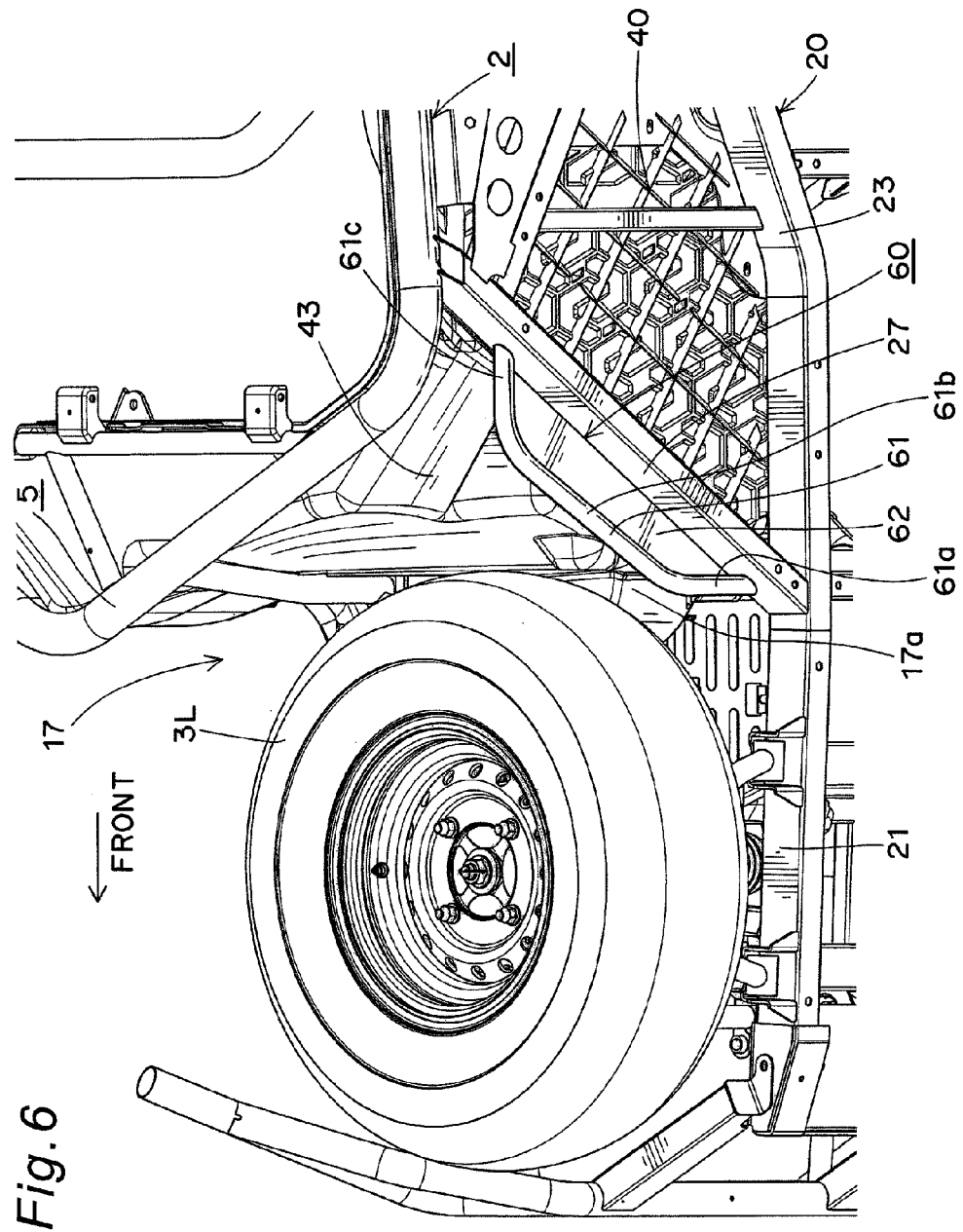
FIG. 6 is an enlarged perspective view of a left front wheel and its periphery of a utility vehicle viewed upward from an oblique rear left direction.

A left front cross member 27 extending obliquely rearward from the center side to the outward direction in plan view is linked to the front end part of the frontward straight line part of the left center frame 23. FIG. 6 is an enlarged perspective view of the left front wheel 3L and its periphery of the utility vehicle 1 viewed upward from an oblique rear left direction. As shown in FIG. 6, the left front cross member 27 is arranged at a position facing the left front wheel 3L and separated from the left front wheel 3L by a distance sufficient for ensuring a steering margin for the left front wheel 3L. The rear end part of the left front cross member 27 is linked to the front end part of the frontward bent part of the left rear frame 25. Similarly, a right front cross member 28 extending obliquely rearward from the center side to the outward direction in plan view is linked to the front end part of the frontward straight line part of the right center frame 24. The right front cross member 28 is arranged at a position facing the right front wheel 3R and separated from the right front wheel 3R by a distance sufficient for ensuring a steering margin for the right front wheel 3R. The rear end part of the right front cross member 28 is linked to the front end part of the frontward bent part of the right rear frame 26.

A left rear cross member 29 extending obliquely frontward is linked to a frontward part of the rearward straight line part of the left rear frame 25. The frontward part of the left rear cross member 29 is linked to the rear end part of the rearward bent part of the left front frame 23. The respective linkage parts described above are fixed by welding, bolting, or the like. In the upper face of the mainframe 20, floor plates 40 are attached in the foot-side areas for crew members extending at least from the rearward parts of the left front cross member 27 and the right front cross member 28 to the frontward parts of the crew seats 6.

As shown in FIGS. 3, 4, and 5, a bonnet support unit 33, a crew seat support unit 34, an engine room unit 35, a loading platform support unit 36, and the like are attached to the mainframe 20 by welding, bolting, or the like. Each of these units is constructed from an appropriate combination of: a plurality of mast members extending in the vehicle-body height directions (the up-down directions); a plurality of cross members extending in the vehicle-body width directions (the right-left directions); and reinforcement members.

As shown in FIGS. 1 to 6, the left wheel house 17 and the right wheel house 18 are formed such as to surround the left front wheel 3L and the right front wheel 3R, respectively. As shown in FIGS. 4 and 6, a left mud guard wall 43 is attached to the left front cross member 27. The left mud guard wall 43 separates the cabin 5A from a space 17a on the rear side of the left front wheel 3L in the left wheel house 17. As shown in FIG. 3, a right mud guard wall 44 is attached to the right front cross member 28. As shown in FIG. 2, the right mud guard wall 44 separates the cabin 5A from a space 18a on the rear side of the right front wheel 3R in the right wheel house 18.

(Structure of Front Under Guards 60 and 70)

As shown in FIG. 3, a left front under guard 60 and a right front under guard 70 are attached respectively to the frontward part 27a of the left front cross member 27 and the frontward part 28a of the right front cross member 28. Here, as shown in FIGS. 4 and 6, the left front under guard 60 is attached to the upper region of the frontward part 27a of the left front cross member 27 approximately horizontally in a manner of extending frontward. Although not shown in the figure, the right front under guard 70 is attached to the upper region of the frontward part 28a of the right front cross member 28 approximately horizontally in a manner of extending frontward. The left front under guard 60 and the right front under guard 70 are fixed respectively to the left front cross member 27 and the right front cross member 28 by welding, bolting, or the like.

As shown in FIG. 3, the left front under guard 60 is constructed from a left outer framework 61 having a pipe shape and from a left plate-shaped body 62 extending in a plate shape approximately horizontally from the rearward part of the left outer framework 61 to the frontward part 27a of the left front cross member 27. The left outer framework 61 has: a horizontal part 61a extending approximately in the vehicle-body width directions (the right-left directions) toward the outer left direction; a vertical part 61c extending approximately in the vehicle-body front-rear directions; and an oblique part 61b extending obliquely rearward with connecting the horizontal part 61a and the vertical part 61c. Further, the right front under guard 70 is constructed from: a right outer framework 71 of pipe shape; and a left plate-shaped body 72 extending in a plate shape approximately horizontally from the rearward part of the right outer framework 71 to the frontward part 28a of the right front cross member 28. The right outer framework 71 has: a horizontal part 71a extending approximately in the vehicle-body width directions (the right-left directions) toward the outer right direction; a vertical part 71c extending approximately in the vehicle-body front-rear directions; and an oblique part 71b extending obliquely rearward with connecting the horizontal part 71a and the vertical part 71c. Since the left outer framework 61 and the right outer framework 71 have pipe shapes, a rigidity necessary in the front under guards is ensured by using even a smaller amount of material.

The left front under guard 60 and the right front under guard 70 are constructed such that the front face and the rear face of each are allowed to be used in reverse. That is, the left front under guard 60 and the right front under guard 70 are allowed to be attached arbitrarily to the left front cross member 27 or the right front cross member 28. Such a configuration that the front under guards 60 and 70 are allowed to be used in common to the left and the right front cross members 27 and 28 reduces the number of necessary components so as to simplify the management of the components and thereby reduce the cost of the front under guards 60 and 70.

As shown in FIG. 4, in order that the foot-side space for a driver sitting on the left crew seat 6 should be ensured as wide as possible, the left mud guard wall 43 bulges frontward relative to the left front cross member 27. Further, although not shown in the figure, in order that also the foot-side space for a fellow passenger sitting on the right crew seat 6 should be ensured as wide as possible, the right mud guard wall 44 bulges frontward relative to the right front cross member 28. The left and the right mud guard walls 43 and 44 are composed of, for example, resin material. Then, when shaping processing is performed on the resin material, even a complicated bulge shape is realized.

Here, in the floor plate 40 on the left side, that is, on the driver side, an accelerator pedal and a brake pedal (not shown) are arranged. Thus, the left and the right floor plates 40 have mutually different shapes. In accordance with this, the left mud guard wall 43 and the right mud guard wall 44 have slightly different shapes with each other. That is, in the left mud guard wall 43 and the right mud guard wall 44, a shape difference is caused by the arrangement of the accelerator pedal and the brake pedal, and yet the left mud guard wall 43 and the right mud guard wall 44 have almost the same amount of frontward bulge of the guard walls. In particular, the lower parts of the left mud guard wall 43 and the right mud guard wall 44 are constructed such that the amount of frontward bulge is the same in the two guard walls. As shown in FIG. 3, when the vehicle-body frame 2 is viewed from the bottom, at least the lower parts of the left mud guard wall 43 and the right mud guard wall 44 are covered and veiled respectively by the left front under guard 60 and the right front under guard 70.

Second Embodiment

Figure 7:
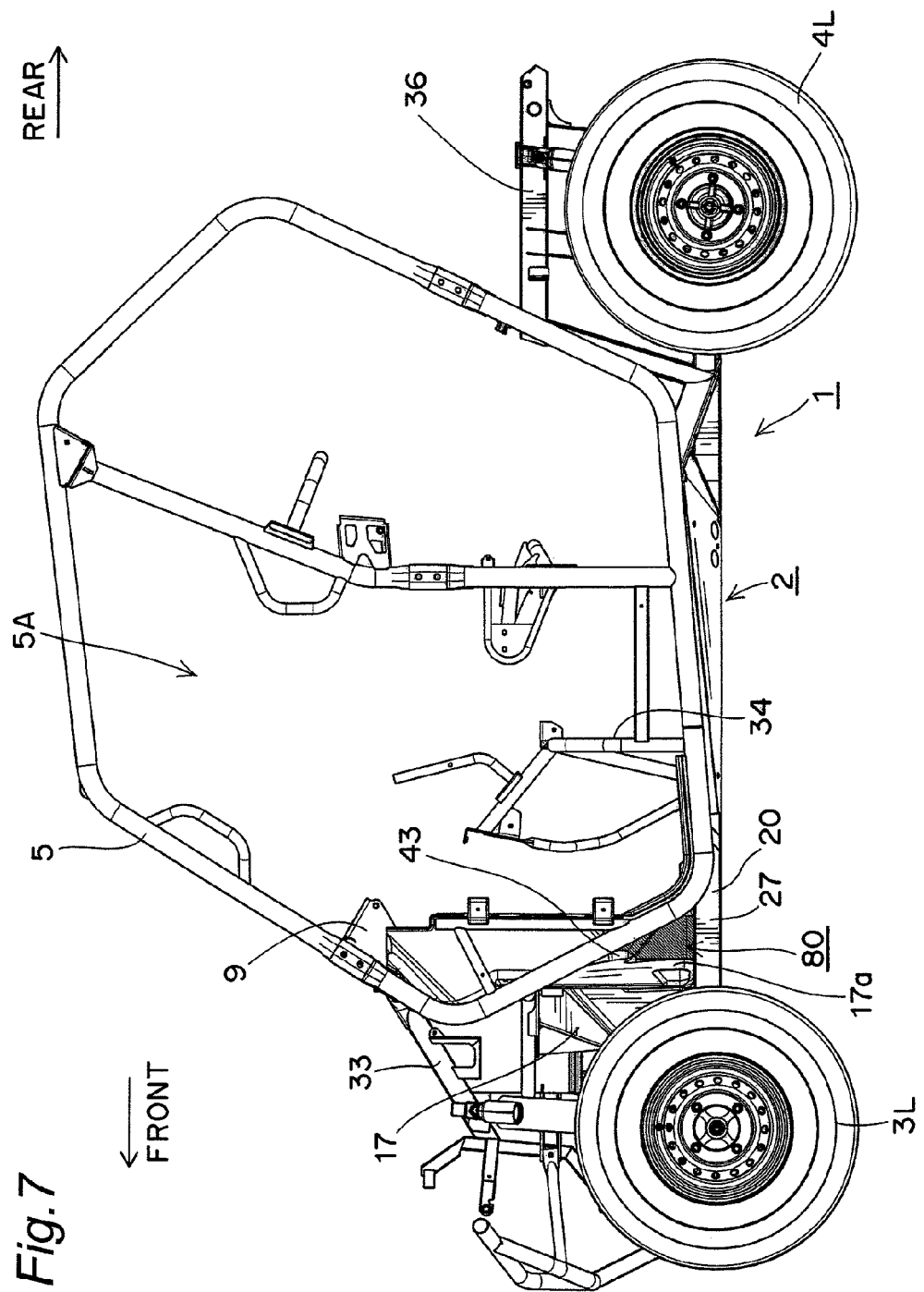
FIG. 7 is a left side view of a vehicle-body frame of a utility vehicle according to a second embodiment of the present invention.
Figure 8:
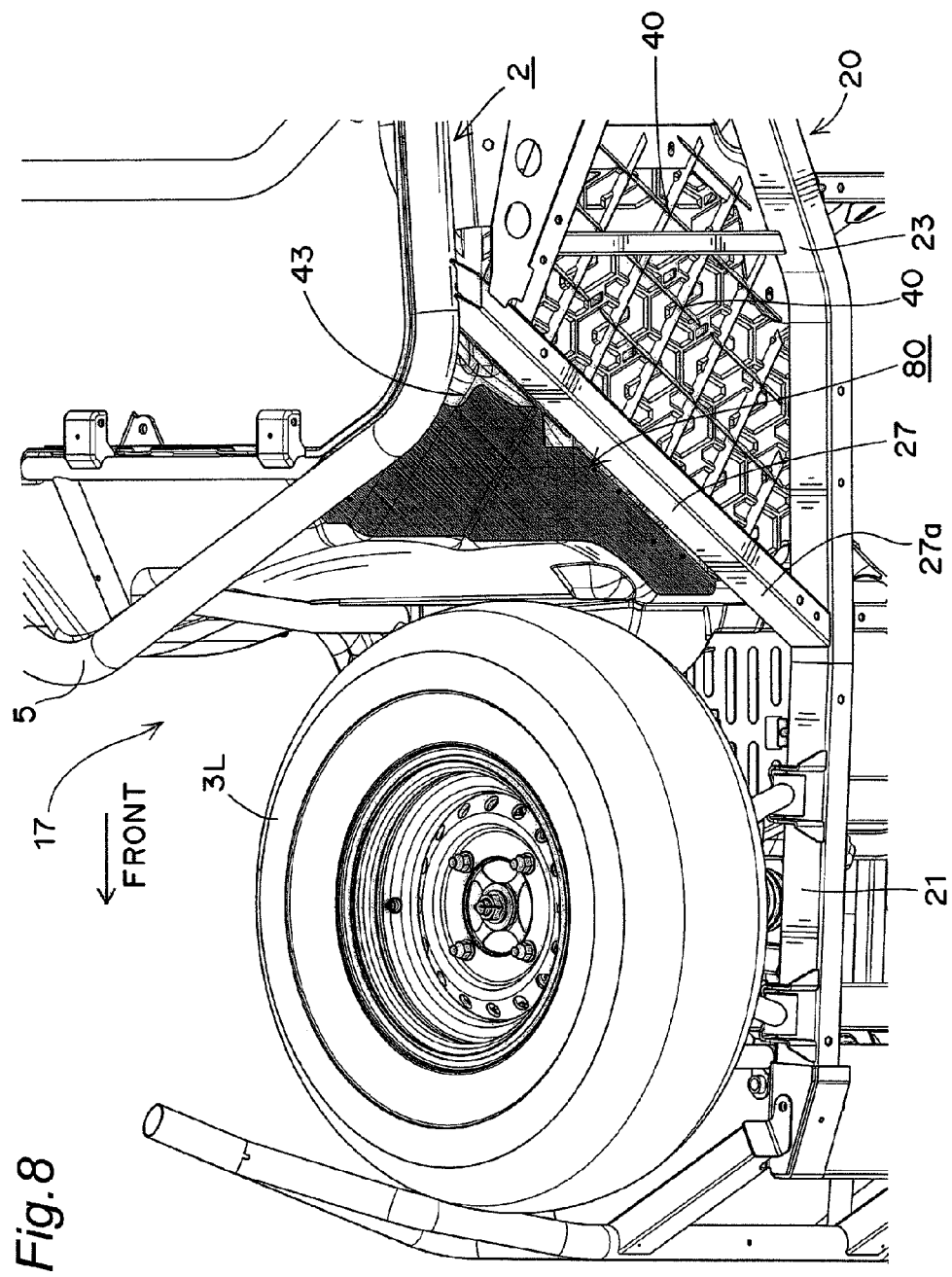
FIG. 8 is an enlarged perspective view of a left front wheel and its periphery shown in FIG. 7, viewed upward from an oblique front left direction.

FIG. 7 is a left side view of a vehicle-body frame 2 of a utility vehicle 1 according to a second embodiment. FIG. 8 is an enlarged perspective view of a left front wheel 3L and its periphery shown in FIG. 7, viewed upward from an oblique front left direction. Here, in the present embodiment, like parts to the first embodiment described above are designated by like numerals and hence their description is omitted.

As shown in FIG. 7, a left wheel house 17 is formed so as to surround the left front wheel 3L. Then, a left mud guard wall 43 for separating the cabin 5A from a space 17a on the rear side of the left front wheel 3L in the left wheel house 17 is attached to a left front cross member 27.

(Structure of Left Front Under Guard 80)

As shown in FIG. 8, a left front under guard 80 is attached directly to at least the outer side surface of the lower part of the left mud guard wall 43. The left front under guard 80 has a shape that follows (corresponds to) the outer shape of the lower part of the left mud guard wall 43 to which the left front under guard 80 is attached, and is constructed, for example, from a metallic material or a resin material. The left front under guard 80 is fixed to the left mud guard wall 43 with bolts or the like.

(Structure of Right Front Under Guard)

Further, although not shown in FIGS. 7 and 8, a right front under guard is attached directly to at least the outer side surface of the lower part of the right mud guard wall. The right front under guard has a shape that follows the outer shape of the lower part of the right mud guard wall to which the right front under guard is attached, and is constructed, for example, from a metallic material or a resin material. The right front under guard is fixed to the right mud guard wall with bolts or the like.

Thus, when the left wheel house 17 and the right wheel house 18 of the utility vehicle 1 are viewed from the frontward direction, at least the lower parts of the left mud guard wall 43 and the right mud guard wall 44 are covered and veiled respectively by the left front under guard 80 and the right front under guard.

Third Embodiment

Figure 9:
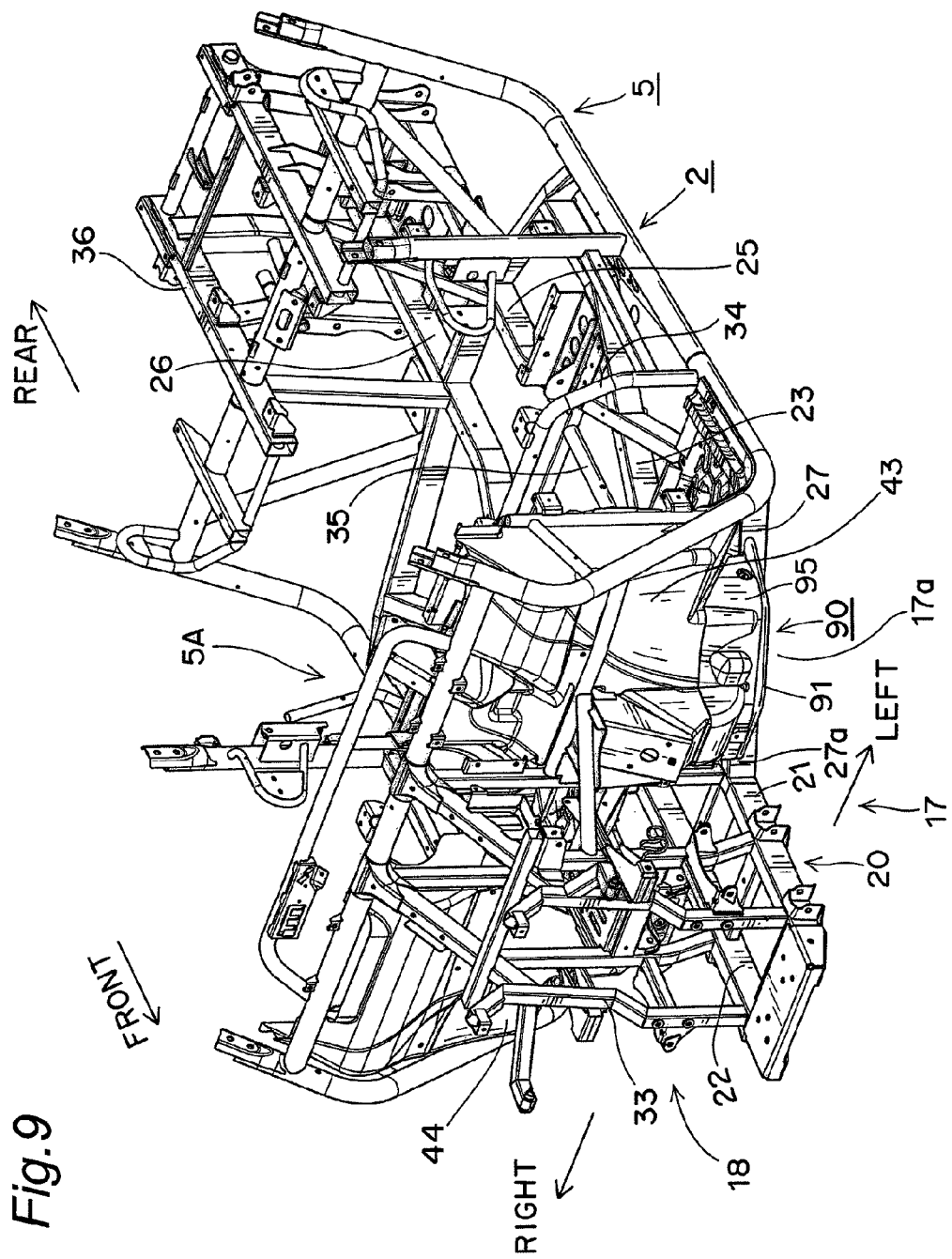
FIG. 9 is a perspective view of a vehicle-body frame of a utility vehicle according to a third embodiment of the present invention, viewed downward from an oblique front left direction.
Figure 10:
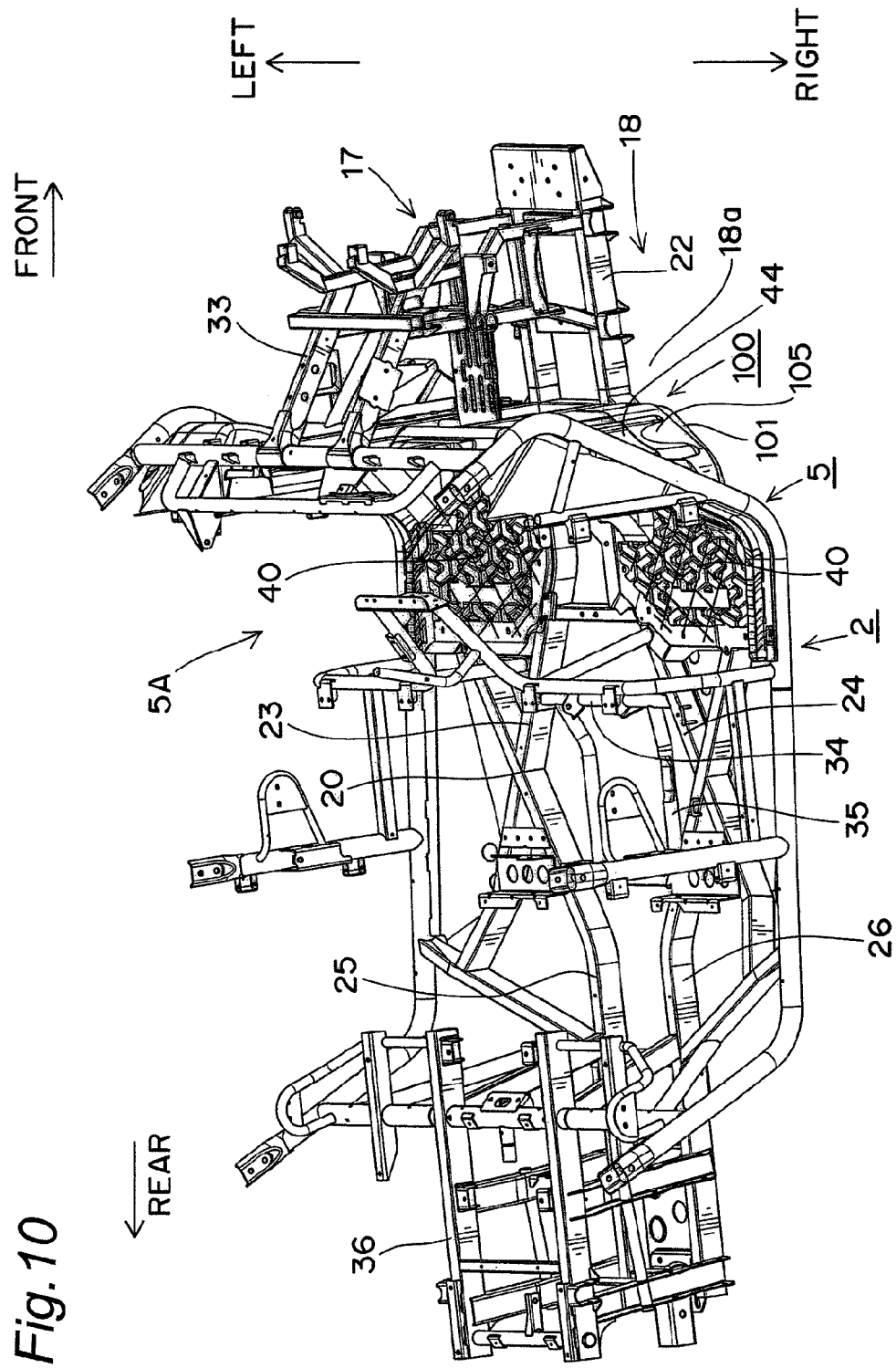
FIG. 10 is a perspective view of a vehicle-body frame shown in FIG. 9, viewed downward from an upper right direction.

FIG. 9 is a perspective view of a vehicle-body frame 2 of a utility vehicle 1 according to a third embodiment of the present invention, viewed downward from an oblique front left direction. FIG. 10 is a perspective view of the vehicle-body frame 2 shown in FIG. 9, viewed downward from an upper right direction. Here, also in the present embodiment, like parts to the first and the second embodiments described above are designated by like numerals and hence their description is omitted.

As shown in FIGS. 9 and 10, similarly to the first embodiment, the left wheel house 17 and the right wheel house 18 are formed such as to respectively surround a left front wheel and a right front wheel (not shown). A left mud guard wall 43 and a right mud guard wall 44 for separating the cabin 5A from the spaces 17a and 18a on the rear sides of the left front wheel and the right front wheel in the left wheel house 17 and the right wheel house 18 are attached to the left front cross member 27 and the right front cross member 28, respectively. A left front under guard 90 and a right front under guard 100 are attached respectively to the frontward part 27a of the left front cross member 27 and the frontward part 28a of the right front cross member 28.

(Structure of Left Front Under Guard 90)

As shown in FIG. 9, the left front under guard 90 has: a left outer framework 91 of pipe shape; a left plate-shaped body (not shown) extending in a plate shape approximately horizontally from the rearward part of the left outer framework 91 to the frontward part 27a of the left front cross member 27; and a left rise guard wall 95 arranged in the frontward part of the left front under guard 90. Similarly to the left outer framework 61 in the first embodiment, the left outer framework 91 has: a horizontal part extending approximately in the vehicle-body width directions (the right-left directions) toward the outer left direction; a vertical part extending approximately in the vehicle-body front-rear directions; and an oblique part extending obliquely rearward with connecting the horizontal part and the vertical part. The left outer framework 91 and the left plate-shaped body are attached to the upper region of the frontward part 27a of the left front cross member 27 approximately horizontally in a manner of extending frontward. Thus, when the left wheel house 17 of the utility vehicle 1 is viewed from the bottom, at least the lower part of the left mud guard wall 43 is covered and veiled by the left outer framework 91 and the left plate-shaped body. The left outer framework 91 and the left plate-shaped body are fixed to the left front cross member 27 by welding, bolting, or the like.

When the left wheel house 17 of the utility vehicle 1 is viewed from the frontward direction, the left rise guard wall 95 covers at least the lower part of the left mud guard wall 43. In the left rise guard wall 95, a plate-shaped body bent along the shape of the left outer framework 91 may rise in the up-down directions. Alternatively, a plate-shaped body may rise along the outer shape of the lower part of the left mud guard wall 43. By using a bracket not shown, the left rise guard wall 95 is fixed to the frontward part of the left front under guard 90, that is, to the front end part of the left outer framework 91 and/or the left plate-shaped body. Thus, the left rise guard wall 95 is attached easily. Here, in the left front under guard 90, the left rise guard wall 95 may be constructed in a separated form. Then, the left rise guard wall 95 in the separated form may be attached directly to the outer side surface of the lower part of the left mud guard wall 43 with bolts or the like. In this case, the left rise guard wall 95 has a shape has a shape that follows the outer shape of the lower part of the left mud guard wall 43 to which the left rise guard wall 95 is attached.

(Structure of Right Front Under Guard 100)

Similarly, as shown in FIG. 10, the right front under guard 100 has: a right outer framework 101 of pipe shape; a right plate-shaped body (not shown) extending in a plate shape approximately horizontally from the rearward part of the right outer framework 101 to the frontward part 28a of the right front cross member 28; and a right rise guard wall 105 arranged in the frontward part of the right front under guard 100. Similarly to the right outer framework 71 in the first embodiment, the right outer framework 101 has: a horizontal part extending approximately in the vehicle-body width directions (the right-left directions) toward the outer right direction; a vertical part extending approximately in the vehicle-body front-rear directions; and an oblique part extending obliquely rearward with connecting the horizontal part and the vertical part. The right outer framework 101 and the right plate-shaped body are attached to the upper region of the frontward part 28a of the right front cross member 28 approximately horizontally in a manner of extending frontward. Thus, when the right wheel house 18 of the utility vehicle 1 is viewed from the bottom, at least the lower part of the right mud guard wall 44 is covered and veiled by the right outer framework 101 and the right plate-shaped body. The right outer framework 101 and the right plate-shaped body are fixed to the right front cross member 28 by welding, bolting, or the like.

When the right wheel house 18 of the utility vehicle 1 is viewed from the frontward direction, the right rise guard wall 105 covers at least the lower part of the right mud guard wall 44. In the right rise guard wall 105, a plate-shaped body bent along the shape of the right outer framework 101 may rise in the up-down directions. Alternatively, a plate-shaped body may rise along the outer shape of the lower part of the right mud guard wall 44. By using a bracket not shown, the right rise guard wall 105 is fixed to the frontward part of the right front under guard 100, that is, to the front end part of the right outer framework 101 and/or the right plate-shaped body.

Thus, the right rise guard wall 105 is attached easily. Here, in the right front under guard 100, the right rise guard wall 105 may be constructed in a separated form. Then, the right rise guard wall 105 in the separated form may be attached directly to the outer side surface of the lower part of the right mud guard wall 44 with bolts or the like. In this case, the right rise guard wall 105 has a shape has a shape that follows the outer shape of the lower part of the right mud guard wall 44 to which the right rise guard wall 105 is attached.

As shown in FIG. 9, the left mud guard wall 43 bulges frontward relative to the left front cross member 27. Further, as shown in FIG. 10, the right mud guard wall 44 bulges frontward relative to the right front cross member 28. The left mud guard wall 43 and the right mud guard wall 44 are constructed such that the overall amount of frontward bulge is almost the same in the two guard walls. In particular, the lower parts of the left mud guard wall 43 and the right mud guard wall 44 are constructed such that the amount of frontward bulge is the same in the two guard walls. Although not shown in the figure, when the vehicle-body frame 2 is viewed from the bottom, at least the lower parts of the left mud guard wall 43 and the right mud guard wall 44 are covered and veiled respectively by the left outer framework 91 or the left plate-shaped body and by the right outer framework 101 or the right plate-shaped body.

Fourth Embodiment

Figure 11:
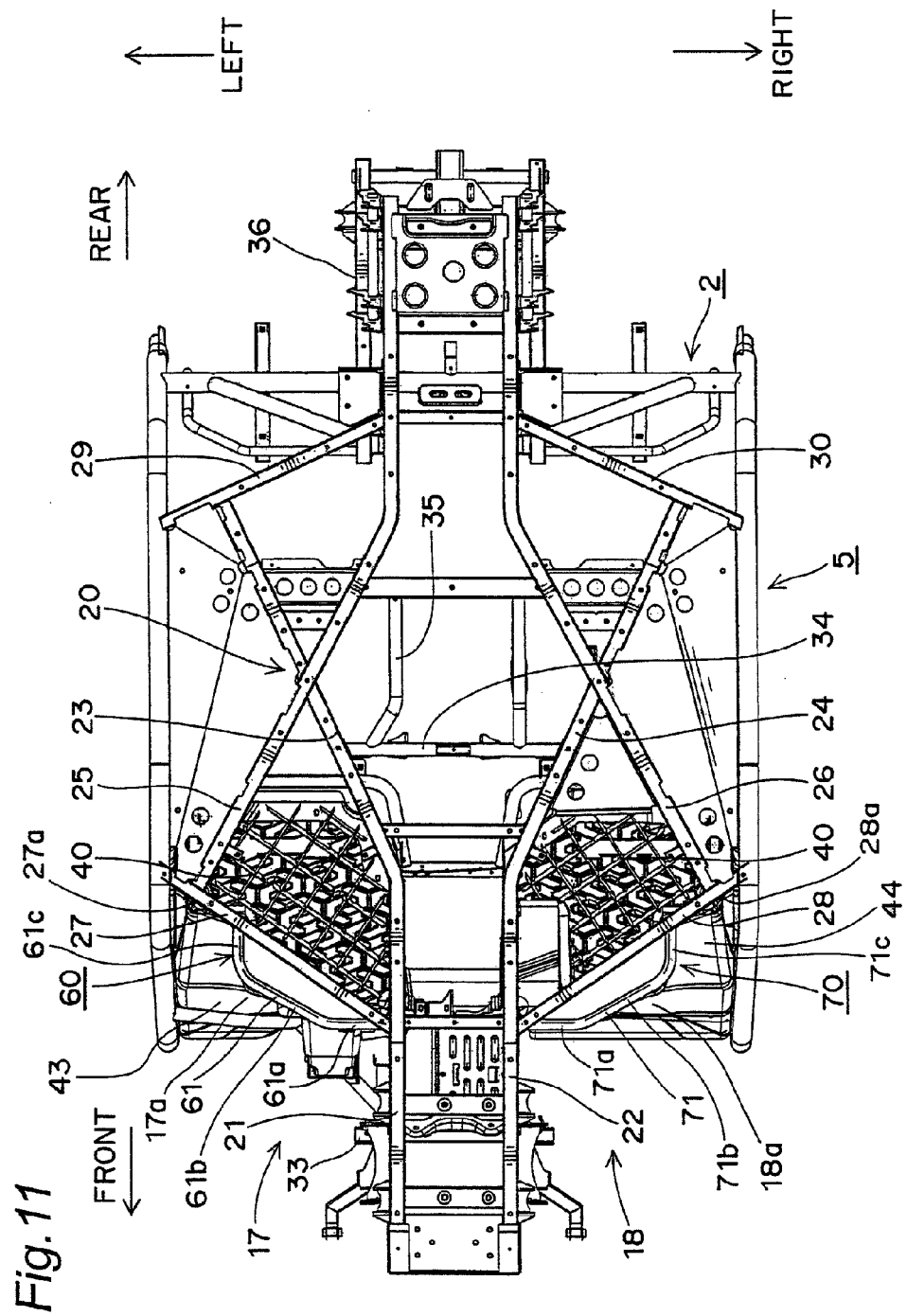
FIG. 11 is a bottomview of a vehicle-body frame of a utility vehicle according to a fourth embodiment of the present invention.

FIG. 11 is a bottom view of a vehicle-body frame 2 of a utility vehicle 1 according to a fourth embodiment. Here, also in the present embodiment, like parts to the first embodiment described above are designated by like numerals and hence their description is omitted.

(Structure of Front Under Guards 60 and 70)

As shown in FIG. 11, a left front under guard 60 and a right front under guard 70 are attached respectively to the frontward part 27a of the left front cross member 27 and the frontward part 28a of the right front cross member 28. The left front under guard 60 is constructed from a left outer framework 61 of pipe shape. The left outer framework 61 serving as the left front under guard 60 is attached to the upper region of the frontward part 27a of the left front cross member 27 approximately horizontally in a manner of extending frontward. The right front under guard 70 is constructed from a right outer framework 71 of pipe shape. Similarly, the right outer framework 71 serving as the right front under guard 70 is attached to the upper region of the frontward part 28a of the right front cross member 28 approximately horizontally in a manner of extending frontward. The left outer framework 61 and the right outer framework 71 are fixed respectively to the left front cross member 27 and the right front cross member 28 by welding, bolting, or the like.

As shown in FIG. 11, the left outer framework 61 has: a horizontal part 61a extending approximately in the vehicle-body width directions (the right-left directions) toward the outer left direction; a vertical part 61c extending approximately in the vehicle-body front-rear directions; and an oblique part 61b extending obliquely rearward with connecting the horizontal part 61a and the vertical part 61c. Further, the right outer framework 71 has: a horizontal part 71a extending approximately in the vehicle-body width directions (the right-left directions) toward the outer right direction; a vertical part 71c extending approximately in the vehicle-body front-rear directions; and an oblique part 71b extending obliquely rearward with connecting the horizontal part 71a and the vertical part 71c. The left front under guard 60 and the right front under guard 70 are constructed respec-
tively from the left outer framework 61 and the right outer framework 71 of pipe shape. Thus, in a state that a rigidity necessary in the left and the right front under guards 60 and 70 is ensured, the number of components necessary for constructing the left and the right front under guards 60 and 70 is reduced.

The left outer framework 61 and the right outer framework 71 of pipe shape are constructed such that the front face and the rear face of each are allowed to be used in reverse. That is, the left outer framework 61 and the right outer framework 71 are allowed to be attached arbitrarily to the left front cross member 27 or the right front cross member 28. Such a configuration that the left outer framework 61 and the right outer framework 71 of pipe shape are allowed to be used in common to the left and the right front cross members 27 and 28 reduces the number of necessary components so as to simplify the management of the components and thereby reduce the cost of the left and the right front under guards 60 and 70.

Here, the first, third, and fourth embodiments described above may additionally employ the left front under guard 80 and the right front under guard directly attached respectively to the left mud guard wall 43 and the right mud guard wall as described in the above-mentioned second embodiment.

Here, the above-mentioned embodiments have been described for the case of a four-wheel utility vehicle having one pair of left and right front wheels and one pair of left and right rear wheels. However, the structure of front under guards according to the present invention may be applied even to utility vehicles like a six-wheel vehicle having one pair of left and right front wheels and two pairs of left and right rear wheels and an eight-wheel vehicle having one pair of left and right front wheels and three pairs of left and right rear wheels.

Here, the present invention is not limited to the detailed configurations of the individual embodiments described above, and includes various kinds of modifications as long as they do not depart from the scope described in the claims.

The invention claimed is:
1. A utility vehicle comprising:
a mainframe between a pair of left and right front wheels and a pair of left and right rear wheels, said mainframe configured to form a framework of a chassis;
a ROPS (Roll-Over Protective Structure) in a middle part of said mainframe with respect to a vehicle-body front-rear direction of said mainframe, and said ROPS being configured to surround a cabin; and
front under guards provided in spaces on rear sides of front wheels so as to cover mud guard walls arranged to separate the cabin from the spaces on the rear sides of the front wheels, said front under guards being attached to frontward parts of front cross members of said mainframe at positions facing the front wheels, and said front under guards being constructed from outer frameworks having a pipe shape.
2. The utility vehicle according to claim 1, wherein said front under guards are further constructed from plate-shaped bodies extending from said outer frameworks toward said frontward parts of said front cross members.
3. The utility vehicle according to claim 1, wherein said front under guards are attached so as to extend in an approximately horizontal direction to said frontward parts of said front cross members.
4. The utility vehicle according to claim 1, wherein said front cross members of said mainframe extend obliquely rearward toward outer sides as viewed in plan view.

5. The utility vehicle according to claim 1, wherein said front under guards further include rise guard walls rising from frontward parts of said front under guards.

6. The utility vehicle according to claim 1, wherein said front under guards are attached directly to outer side surfaces of said mud guard walls.

7. The utility vehicle according to claim 1, wherein said front under guards are each configured to be usable in association with either the left front wheel or the right front wheel.

8. A utility vehicle comprising:
a mainframe between a pair of left and right front wheels and a pair of left and right rear wheels, said mainframe configured to form a framework of a chassis;
a ROPS (Roll-Over Protective Structure) in a middle part of said mainframe with respect to a vehicle-body front-rear direction of said mainframe, and said ROPS being configured to surround a cabin; and
front under guards provided in spaces on rear sides of front wheels so as to cover mud guard walls arranged to separate the cabin from the spaces on the rear sides of the front wheels, said front under guards being attached directly to outer side surfaces of said mud guard walls.

9. The utility vehicle according to claim 8, wherein said front under guards are further constructed from plate-shaped bodies extending from outer frameworks toward frontward parts of front cross members.

10. The utility vehicle according to claim 8, wherein said front under guards are attached so as to extend in an approximately horizontal direction to said frontward parts of said front cross members.

11. The utility vehicle according to claim 8, wherein said front cross members of said mainframe extend obliquely rearward toward outer sides as viewed in plan view.

12. The utility vehicle according to claim 8, wherein said front under guards further include rise guard walls rising from frontward parts of said front under guards.

13. The utility vehicle according to claim 8, wherein said front under guards are each configured to be usable in association with either the left front wheel or the right front wheel.

* * * * *